(12) United States Patent
Corrado

(10) Patent No.: US 7,421,537 B2
(45) Date of Patent: Sep. 2, 2008

(54) MIGRATING DATA BETWEEN STORAGE VOLUMES

(75) Inventor: Francis R. Corrado, Newton, MA (US)

(73) Assignee: Intel Corporation, Santa Clara, CA (US)

( * ) Notice: Subject to any disclaimer, the term of this patent is extended or adjusted under 35 U.S.C. 154(b) by 637 days.

(21) Appl. No.: 10/806,500

(22) Filed: Mar. 22, 2004

(65) Prior Publication Data

US 2005/0210322 A1   Sep. 22, 2005

(51) Int. Cl.
*G06F 12/00* (2006.01)
(52) U.S. Cl. ........................................ 711/114
(58) Field of Classification Search .................. 711/114
See application file for complete search history.

(56) References Cited

U.S. PATENT DOCUMENTS 6,530,004 B1 * 3/2003 King et al. .................. 711/165

2005/0108730 A1   5/2005 Corrado et al.

OTHER PUBLICATIONS

D. Patterson, et al. "A Case for Redundant Arrays of Inexpensive Disks (RAID)," Association of Computing Machinery, 1988; pp. 109-116.

* cited by examiner

*Primary Examiner*—Matt Kim
*Assistant Examiner*—Ryan Dare
(74) *Attorney, Agent, or Firm*—Christopher K. Gagne; Caroline M. Fleming

(57) ABSTRACT

Provided are a method, system, and program for migrating data between storage volumes. A source map is provided indicating blocks of data striped across a first plurality of storage units and a destination map is provided indicating blocks of data striped across a second plurality of storage units, wherein data is migrated from stripes indicated in the source map to corresponding stripes indicated in the destination map. In response to determining that the source stripe and the destination stripe occupy a same physical location on the storage units, the data from a source stripe is written to a copy area and writing the data from the copy area to a corresponding destination stripe.

42 Claims, 8 Drawing Sheets

Checkpoint Record

RAID Map

MIGRATING DATA BETWEEN STORAGE VOLUMES

BACKGROUND

In a Redundant Array of Independent Disk (RAID) storage system, data from a file is stored in blocks distributed across different disk drives. A strip comprises a number of sequentially addressed blocks written to one of the disks and a strip size comprises the number of blocks of data in a strip. The set of strips of sequentially addressed blocks that are written across the disk drives are referred to as a stripe. A RAID controller stripes the data across the disks configured as RAID devices and calculates a parity, or checksum, value that is written to one disk. The parity data may alternatively be striped or interleaved through the user data on the multiple disks. With parity, if one or more disks fail, the data on the failed disk(s) may be recovered using an algorithm that combines the parity data and the data on the surviving disks to rebuild the data on the failed disk(s). Further details on RAID technology are described in the publication "A Case for Redundant Arrays of Inexpensive Disks (RAID) by D. A. Patterson et al., Ass'n of Computing Machinery, Proceedings of the SIGMOD, pgs. 109-116 (1988).

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made without departing from the scope of the embodiments.

Figure 1:
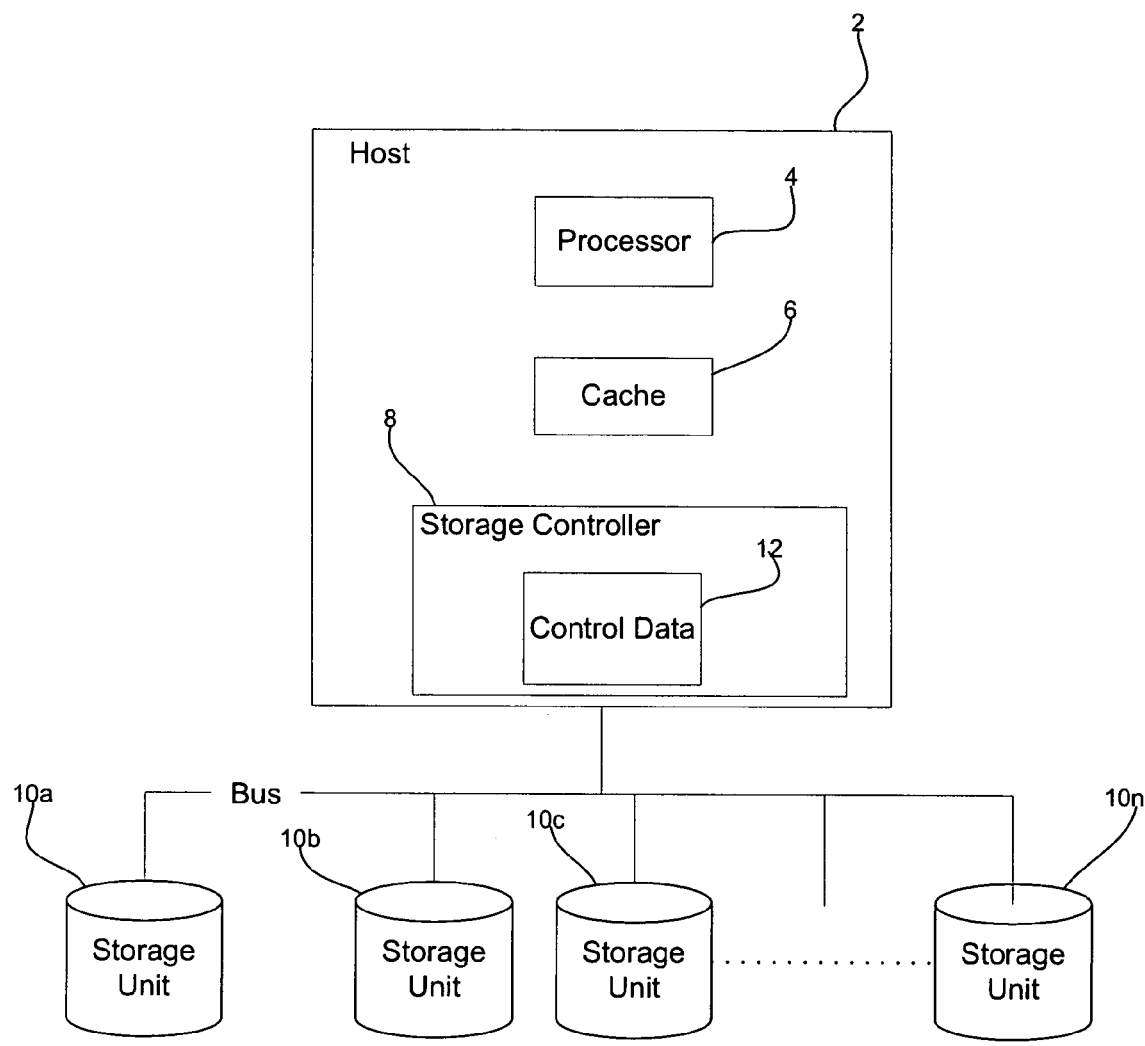
FIG. 1 illustrates a computing environment in which embodiments are implemented.

FIG. 1 illustrates a storage environment used with the described embodiments. A host system 2 includes a processor 4 and a cache 6 in which received data is stored. The host processor 2 forwards I/O requests to the storage controller 8, which manages the storage of data in storage units 10a, 10b, 10c . . . 10n. In certain embodiments, the storage controller 8 may comprise a RAID controller and stripes blocks of data, or bytes, from a single data object to be stored across the storage units 10a, 10b, 10c . . . 10n, which may comprise magnetic hard disk drives or any other non-volatile storage media known in the art. Further, the storage controller 8 may be implemented in an integrated circuit embedded on the motherboard or as an expansion card that inserts into an expansion card slot of the host 2. As discussed, "striping" refers to the process of writing sequential sets of blocks from a data object across different storage units. A stripe comprises the blocks of data written across all the storage units, where the data written on one storage unit that is part of a stripe is referred to as a strip.

The storage controller 8 maintains control data 12 providing information on how the data is stored in the stripes. The control data 12 may be stored in storage controller 8 buffers and stored in the storage units 10a, 10b, 10c . . . 10n. Further, the control data 12 may be striped across the storage units 10a, 10b, 10c . . . 10n. In RAID embodiments, the storage controller 8 may write parity data for a stripe to one or more of the storage units 10a, 10b, 10c . . . 10n when striping the data, such as the case for RAID 3, 5, etc. A RAID 3 algorithm uses a dedicated parity disk to store redundant information about the data on several data disks and a RAID 5 algorithm distributes the data and parity data across all disks in the array.

Figure 2:
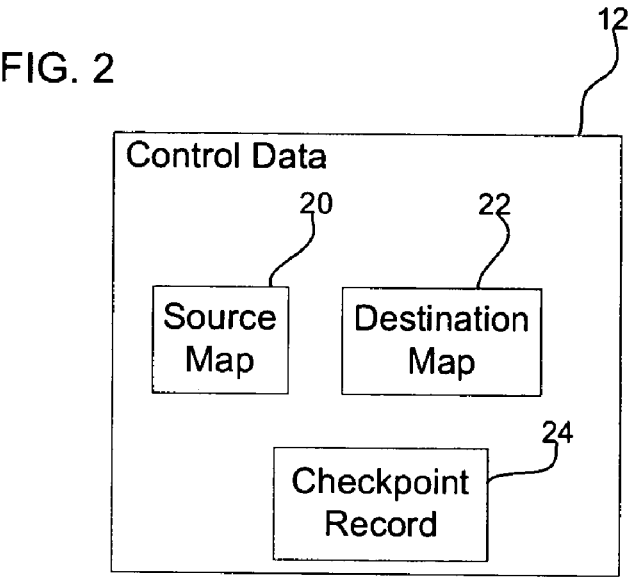
FIGS. 2, 3, and 4 illustrate information maintained to migrate data from a source volume to destination volume in accordance with embodiments.

FIG. 2 illustrates control data 12 that the storage controller 8 may maintain to migrate data from a source volume to a destination volume, where the destination volume may include physical storage locations in the storage units 10a, 10b . . . 10n that overlap the physical storage locations of the source volume. The control data 12 may include a source map 20 containing information needed to access the user data in the source volume and a destination map 22 containing information needed to access the user data in the destination volume. The source volume, which may be configured as a RAID device, is defined by the source map 20 and the destination volume, which may be configured as a RAID device having a different RAID level than the source volume, is defined by the destination map 22. The control data 12 may further include a checkpoint record 26 providing information on an ongoing migration operation to copy stripes from a source volume to a destination volume.

Figure 3:
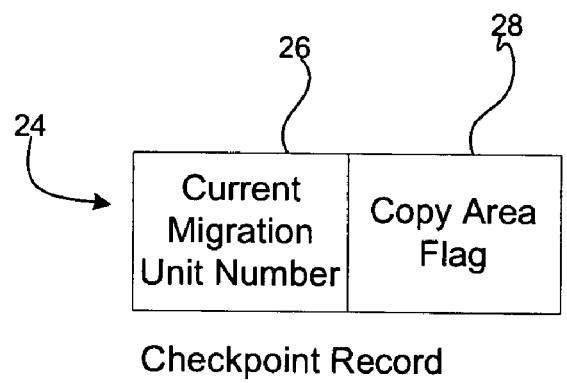

FIG. 3. illustrates information that may be included in a checkpoint record 26, including a current migration unit number 28 indicating a stripe that is currently being migrated from the source volume to the destination volume and a copy area flag 28 indicating whether the source stripe being migrated is buffered in a copy area, which may be included in a configuration area of the storage units 10a, 10b . . . 10n.

Figure 4:
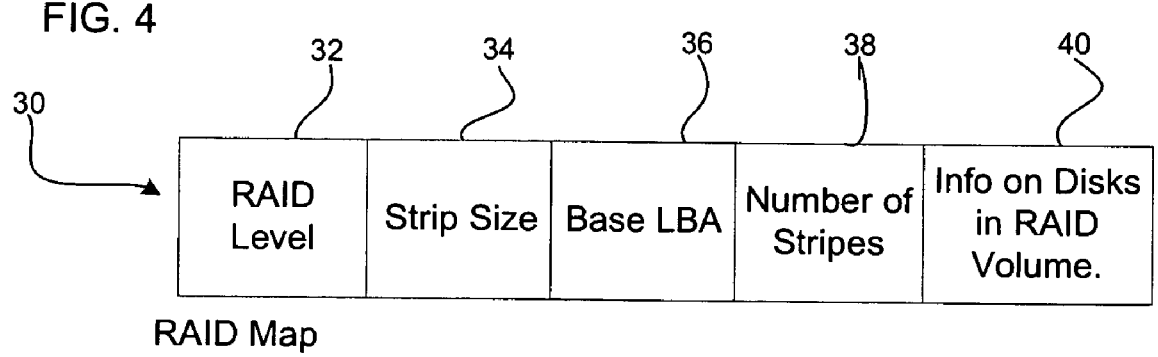

FIG. 4 illustrates an embodiment where the source 20 and destination 22 maps are implemented as RAID maps 30 defining a RAID configured volume and include: a RAID level 32, where the source and destination maps may define volumes having different RAID levels; a strip size 34 indicating the number of blocks in a strip that is written to one disk in the RAID volume, where the source and destination maps may define RAID volumes having different strip sizes; a base logical block address (LBA) 36 indicating a first LBA in the defined volume, where the source and destination maps may define volumes having different first LBAs; a number of stripes 38 indicating the number of stripes in the defined volume, starting from the first LBA; and information on the disks 40 in the defined RAID volume, such as the identity of the disks across which the data is striped.

Figure 5:
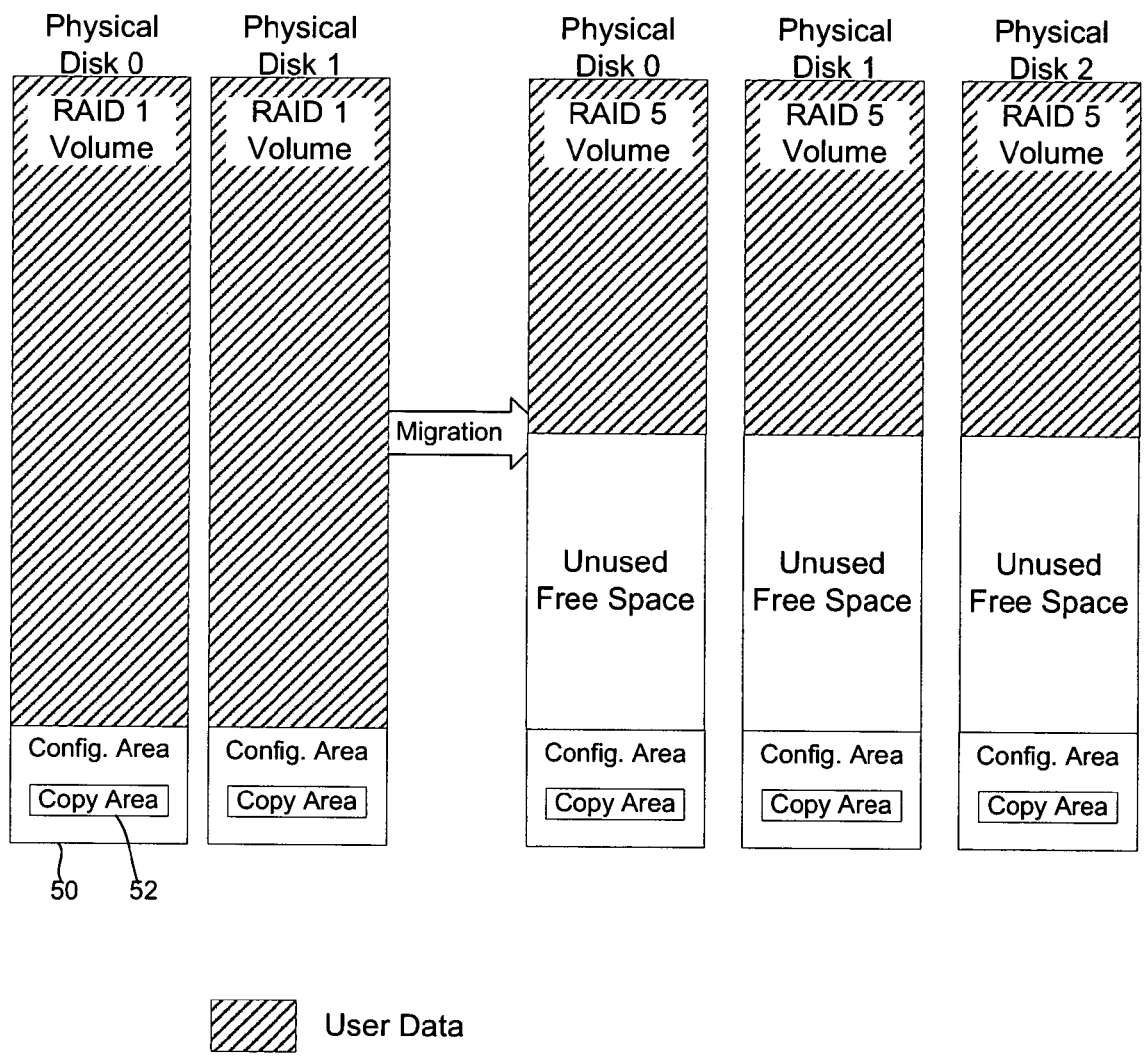
FIGS. 5 and 6 illustrate data in a source volume and destination volume in accordance with described embodiments.

FIG. 5 illustrates one example of a transfer, where data in a RAID 1 source volume occupying disks 0 and 1 that is migrated to a RAID 5 destination volume occupying disks 0, 1, and 2 in accordance with the described embodiments. A RAID 1 implementation provides one mirror disk for every data disk, where the mirror disk maintains a mirror copy of the data in the corresponding data disk. The migration techniques described herein may allow the transfer between different RAID levels. The source map 20 provides information to access the data in the RAID 1 source volume and the destination map 22 provides information to access the data in the RAID 5 destination volume. A configuration area 50 stores in a non-volatile manner the control data 12 so that the control data 12 is available in the event of a power or other failure. The configuration area 50 may further include a copy area 52 into which a source stripe is buffered before being written to the destination stripe in the event the source and destination stripes overlap. An "overlap" occurs if data in the source volume resides at physical locations that will include data from the destination volume to which the source data maps. The data in the configuration area 50 and copy area 52 may be striped across the disks with parity information, as sown in FIGS. 5 and 6, to allow recovery of the control data in the event of a disk failure during the migration.

Figure 6:
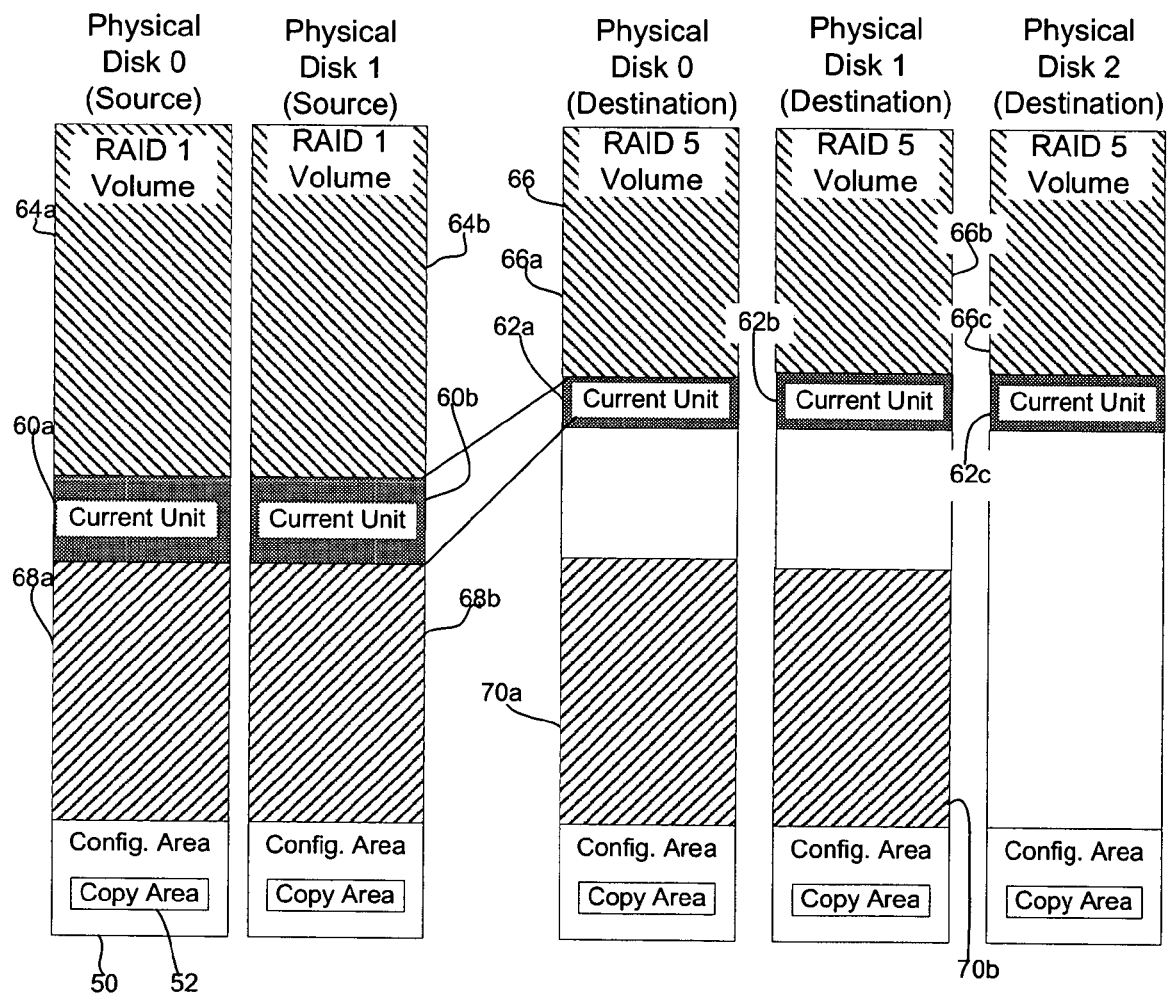

FIG. 6 illustrates how data from the source volume is copied to the destination volume. As shown, the source and destination volumes include the same physical disks. In the example of FIG. 6, the data on the source volumes occupies less space on the same physical disks when copied to the greater number of disks including the destination volume. The source current unit 60*a*, 60*b* is copied to a destination current unit 62*a*, 62*b*, 62*c* across the disks comprising the destination volume, where the data being copied in FIG. 6 may comprise the data in the current unit indicated in the current migration unit number 26 (FIG. 3). Further, FIG. 6 shows how, in certain migrations, the data copied from the source volume disks 64*a*, 64*b* are mapped to the destination volume disks 66*a*, 66*b*, 66*c*, such that the data in the destination volume has less depth than the source volume. FIG. 6 further shows that during migration, the data not yet copied 68*a*, 68*b* and 70*a*, 70*b* remains on the physical disk. During the current operation, the data in areas 68*a*, 68*b* and 70*a*, 70*b* is the same data on the same physical disks. FIG. 6 further illustrates an example of an overlap, where source and destination data occupy the same physical storage locations on physical disks 0 and 1.

Figure 7:
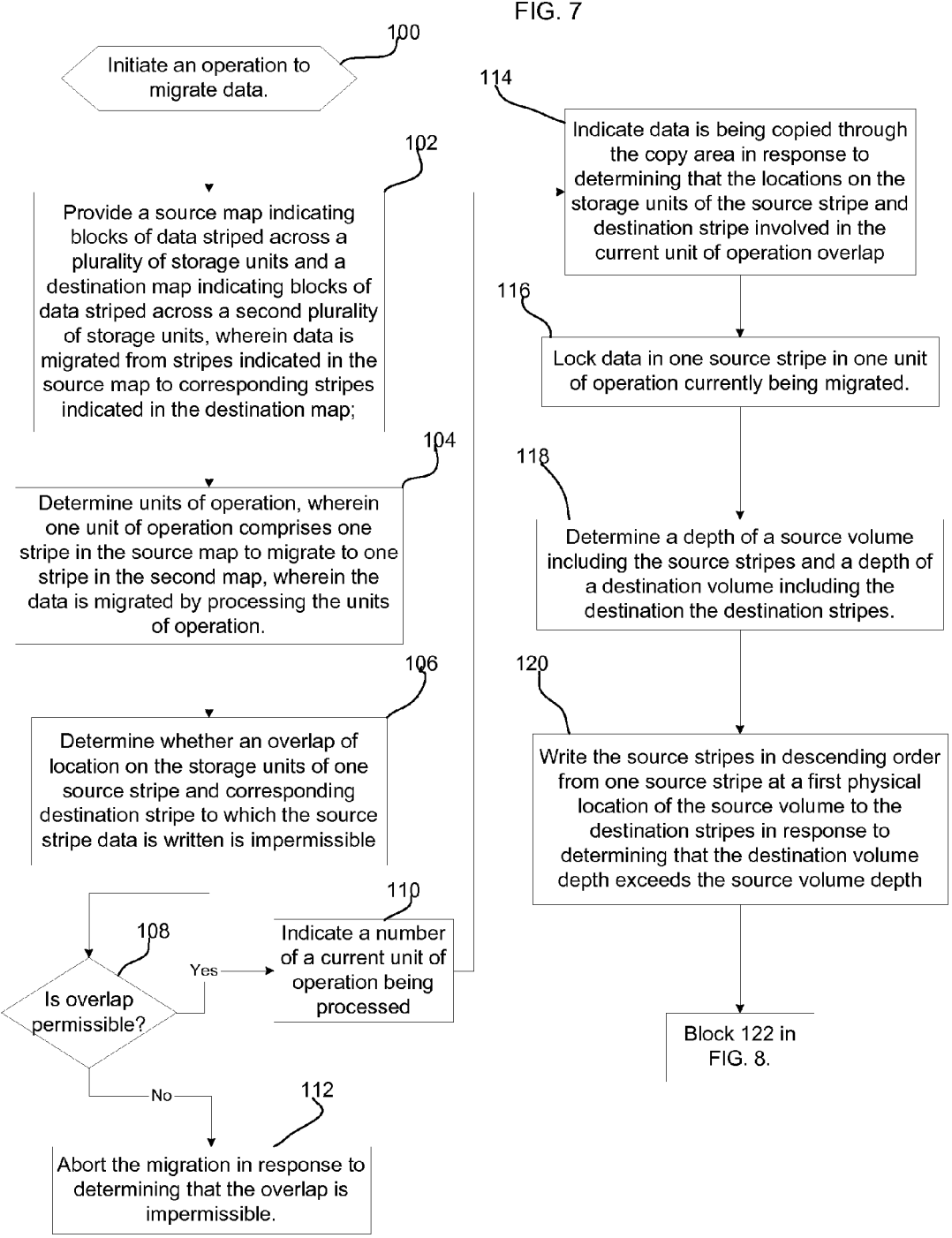
FIGS. 7, 8, 9, and 10 illustrate operations to migrate data in accordance with embodiments.
Figure 8:
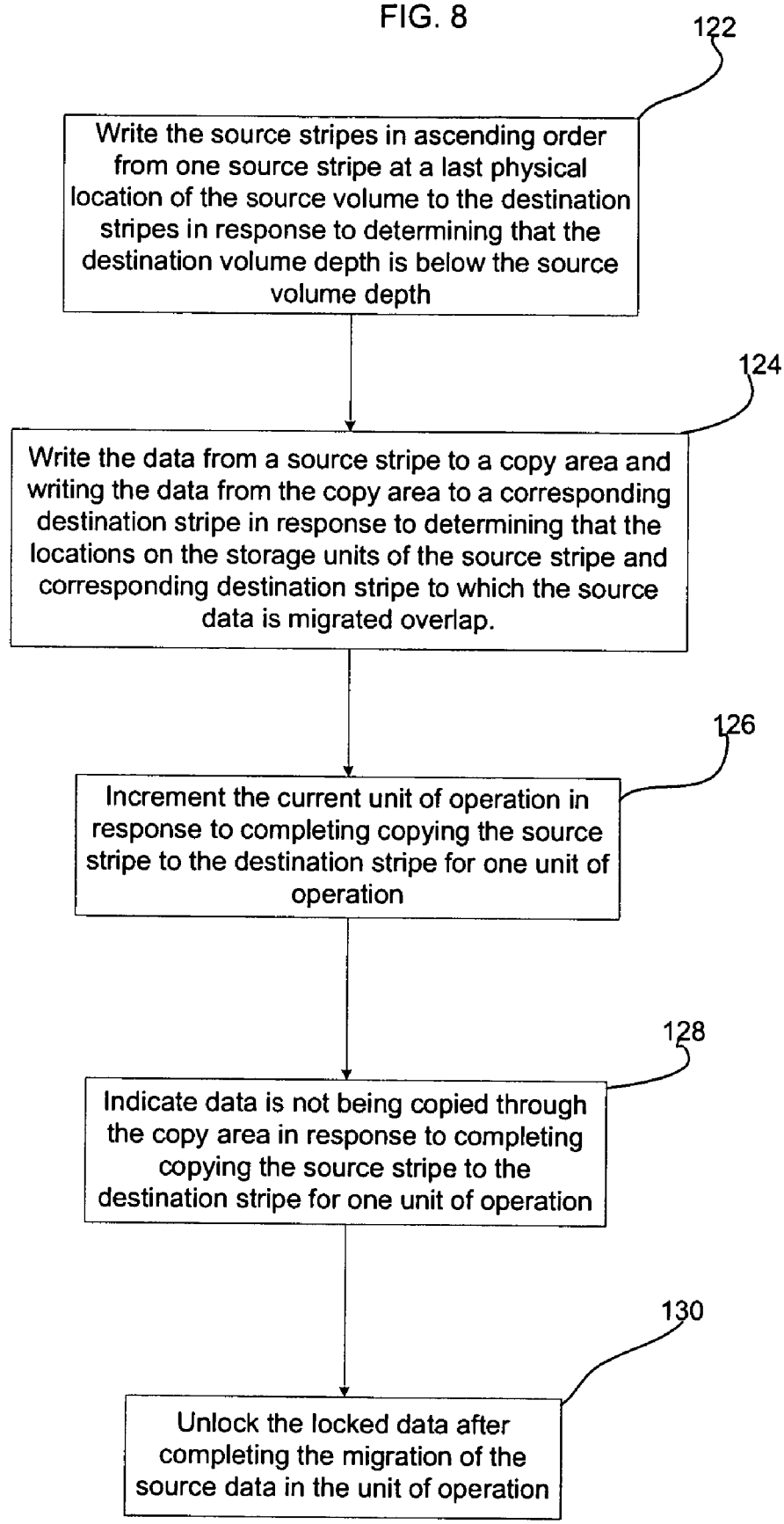

FIGS. 7 and 8 illustrate operations the storage controller 8 performs to migrate data from a source volume to a target volume, such as shown in FIGS. 5 and 6. With respect to FIG. 7, control begins at block 100 with the storage controller 8 initiating an operation to migrate data, which may be in response to a user request through the host system 2. The storage controller 8 provides (at block 102) a source map 20 indicating blocks of data striped across a plurality of storage units 10*a*, 10*b* . . . 10*n* and a destination map 22 indicating blocks of data striped across a second plurality of storage units 10*a*, 10*b* . . . 10*n*, wherein data is migrated from stripes indicated in the source map 20 to corresponding stripes indicated in the destination map 22. The storage controller 8 may generate the source 20 and destination 22 maps in response to receiving the migration request. The storage controller 8 determines (at block 104) units of operation, wherein one unit of operation comprises one or more stripes in the source map to migrate to one or more stripes in the second map, wherein the data is migrated by processing the units of operation.

A determination is also made (at block 106) as to whether an overlap of locations, such as physical blocks, on the storage units of a source stripe(s) and the corresponding destination stripe(s) to which the source stripe(s) are written is impermissible. If the overlap is permissible (at block 108), then the storage controller 8 indicates (at block 110) a number of a current unit of operation 26 (FIG. 3) being processed; otherwise, if the overlap is impermissible, then the migration is aborted (at block 112). In certain embodiments, an overlap may be determined to be permissible if: (1) the destination volume depth is less than or equal to the source volume depth and the physical block address of the first logical block address in the destination volume is less than or equal to the physical block address of the first logical block address of the source volume or (2) if the destination volume depth is greater than the source volume depth and the physical block address of the first logical block address in the destination volume is greater than or equal to the physical block address of the first logical block address of the source volume. Further, if there is an overlap of the source and destination stripes in the unit of operation being considered, then indication is made (at block 114) that data is being copied through a copy area 52 (FIG. 5). The copy area 52 may be contained within the configuration area 50 of the storage units 10*a*, 10*b* . . . 10*n*, such as shown in FIGS. 5 and 6, or within some other non-volatile storage area.

The data in one source stripe in one unit of operation currently being migrated is locked (at block 116). To perform the migration, the storage controller 8 determines (at block 118) a depth of a source volume including the source stripes and a depth of a destination volume including the destination stripes. The stripe across a greater number of storage units (disks) has a lower depth than a stripe across fewer storage units. This outcome is shown in FIG. 6, where the copied source data 64*a*, 64*b* has a greater depth than the destination data 66*a*, 66*b*, 66*c*, which is spread across a greater number of storage units. The storage controller 8 writes (at block 120) the source stripes in descending order from one source stripe at a first physical location of the source volume to the destination stripes in response to determining that the destination volume depth exceeds the source volume depth. Otherwise, with respect to FIG. 8, the storage controller 8 writes (at block 122) the source stripes in ascending order from one source stripe at a last physical location of the source volume to the destination stripes in response to determining that the destination volume depth is less than or equal to the source volume depth. In writing stripes in descending order, the stripe starting at the highest physical address not yet migrated is copied to the next highest available physical address in the destination volume. In writing stripes in ascending order, the stripe starting at the lowest physical source address not yet migrated is copied to the next lowest available physical address in the destination volume.

In response to determining that the locations on the storage units of the source stripe and corresponding destination stripe to which the source data is migrated overlap, the storage controller 8 writes (at block 124) the data from a source stripe to a copy area 52 in non-volatile memory, such as the configuration area 50 (FIG. 5) of the storage units 10*a*,10*b* . . . 10*n*, and writes the data from the copy area 52 to a corresponding destination stripe. If there is no overlap, then the data may be directly copied from the source to destination volumes. After migrating the source data for one unit of operation, the storage controller 8 increments (at block 126) the current unit of operation number 26 in response to completing copying the source stripe to the destination stripe for one unit of operation and indicates (at block 128) that data is not being copied through the copy area 52 in response to completing copying the source stripe to the destination stripe for one unit of operation. The indication of whether to use the copy area 52 may be made in the copy area flag 28. After completing the migration, the locked data in the unit of operation is unlocked (at block 130). The storage controller 8 repeats these operations until all units of operation have completed to copy all source stripes to destination stripes.

Figure 9:
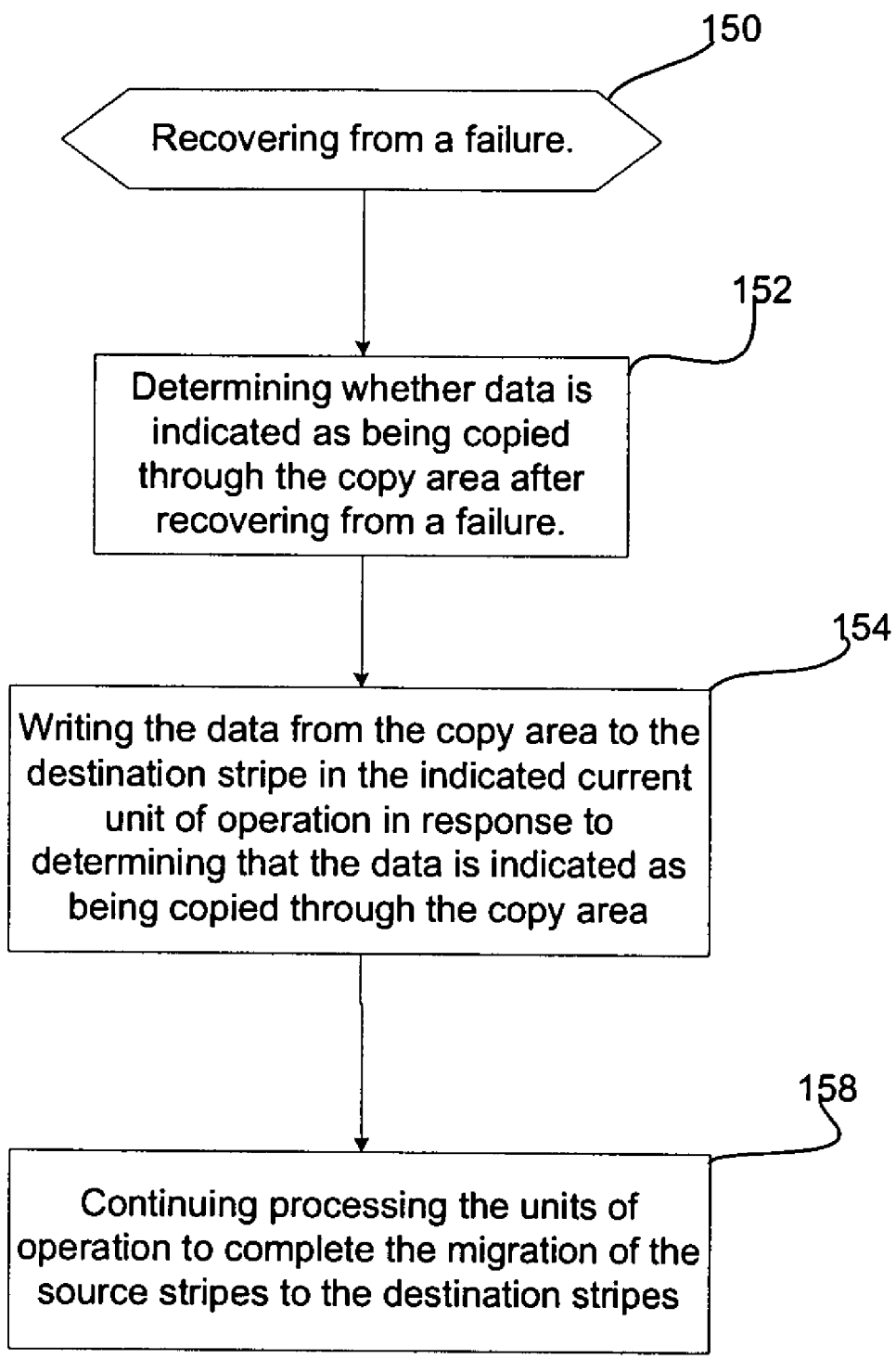

FIG. 9 illustrates operations performed by the storage controller 8 to recover from a failure. Upon recovering from a failure (at block 150), the storage controller 8 determines (at block 152) whether data is indicated as being copied through the copy area 52. This may be done by checking the copy area flag 28 (FIG. 3). Data is written (at block 154) from the copy area 52 to the destination stripe in the indicated current unit of operation 26 in response to determining that the data is indicated as being copied through the copy area. The storage controller 8 may continue processing (at block 158) the units of operation to complete the migration of the source stripes to the destination stripes.

Figure 10:
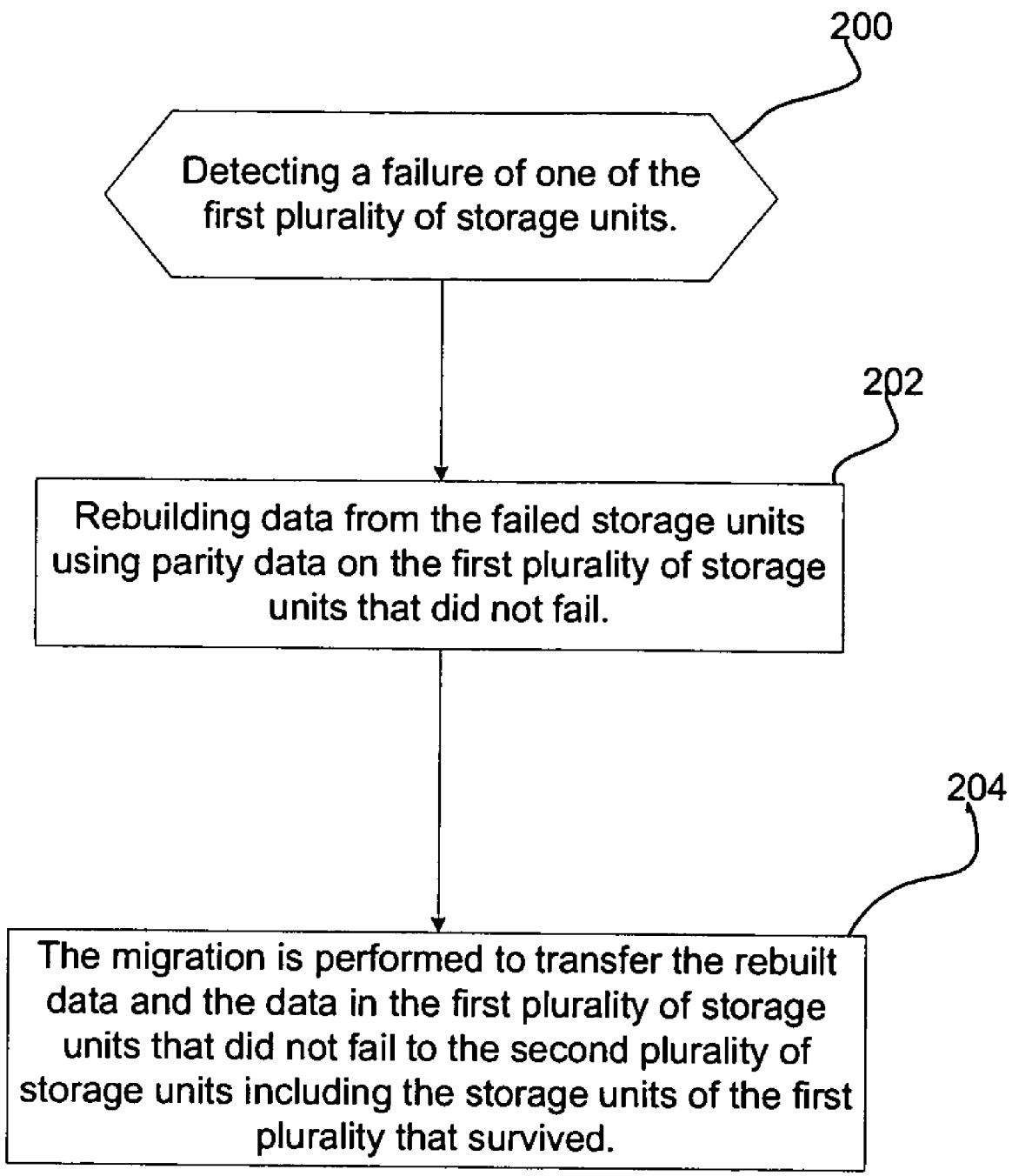

FIG. 10 illustrates operations the storage controller 8 uses to migrate data while rebuilding data from parity data after a disk failure. Upon detecting (at block 200) a failure of one of the first plurality of storage units, the storage controller 8 initiates an operation to recover the data on the failed disk and migrate to a volume having fewer disks, which may comprise a volume at a lower RAID level. This migration occurs if the remaining storage units or disks have sufficient capacity to store all the data in the source volume before the failure. The data from the failed storage units 10a, 10b . . . 10n are rebuilt (at block 202) using parity data on the first plurality of storage units that did not fail, where the first plurality of storage units comprises the storage units of the source volume. The storage controller 8 then migrates (at block 204) the rebuilt data and the data in the first plurality of storage units that did not fail to the second plurality of storage units including the storage units of the first plurality that survived. In this way, data that was previously striped across storage units in the source volume is now striped across one or more fewer storage units, e.g., disks, in the destination volume.

In additional embodiments, if there is a storage unit failure, the data recovered using the RAID algorithms and data remaining on the surviving storage units may be copied to a destination volume having more storage units than the source volume if a greater number of storage units are added after the failure.

The described embodiments thus provide techniques to allow the migration of data from a source volume to destination volume even if data being migrated from the source overlaps with the locations in the destination volume to which the data will be migrated.

Additional Embodiment Details

The described embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the embodiments, and that the article of manufacture may comprise any information bearing medium known in the art.

The described operations may be performed by circuitry, where "circuitry" refers to either hardware or software or a combination thereof. The circuitry for performing the operations of the described embodiments may comprise a hardware device, such as an integrated circuit chip, Programmable Gate Array (PGA), Application Specific Integrated Circuit (ASIC), etc. The circuitry may also comprise a processor component, such as an integrated circuit, and code in a computer readable medium, such as memory, wherein the code is executed by the processor to perform the operations of the described embodiments.

In the described embodiments, the storage units were organized into logical volumes that appear as a single storage space. In alternative embodiments, the storage units may be organized in a different manner.

In certain embodiments, the storage units in a volume are configured using a RAID algorithm where data is striped across multiple disks with parity data optionally written to the disks in the volume. In alternative embodiments, the source and destination volumes may be configured using configurations other than RAID, such as Just of Bunch of Disks (JBOD) configuration, etc. Further, in the described embodiments, data was discussed as being migrated between source and destination volumes having different RAID levels. In additional embodiments, the migration may involve one volume (source or destination) that is RAID and another volume (source or destination) that is not RAID configured.

FIGS. 2 and 3 show certain information maintained with records used with the described embodiments. In additional implementations, these records may include additional or different information than described herein.

The illustrated operations of FIGS. 7, 8, 9, and 10 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments has been presented for the purposes of illustration and description. It is not intended to be exhaustive or to limit the embodiments to the precise form disclosed. Many modifications and variations are possible in light of the above teaching.

What is claimed is:

1. A method, comprising:

providing a source map indicating blocks of data striped across a first plurality of storage units and a destination map indicating blocks of data striped across a second plurality of storage units, wherein data is migrated from stripes indicated in the source map to corresponding stripes indicated in the destination map; and for each of a plurality of source stripes to copy to corresponding destination stripes, separately performing, in response to determining that the source stripe and the destination stripe occupy a same physical location on the storage units, writing the data from a source stripe to a copy area and writing the data from the copy area to a corresponding destination stripe.

2. The method of claim 1, further comprising:

determining units of operation, wherein one unit of operation comprises one stripe indicated in the source map to migrate to one stripe indicated in the second map, wherein the data is migrated by processing the units of operation.

3. The method of claim 2, further comprising:
locking data in one source stripe in one unit of operation currently being migrated; and
unlocking the locked data after completing the migration of the source data in the unit of operation.

4. The method of claim 2, further comprising:
indicating a number of a current unit of operation being processed; and
indicating data is being copied through the copy area in response to determining that the source stripe and destination stripe involved in the current unit of operation occupy the same physical locations.

5. The method of claim 4, further comprising:
incrementing the current unit of operation in response to completing copying the source stripe to the destination stripe for one unit of operation; and
indicating data is not being copied through the copy area in response to completing copying the source stripe to the destination stripe for one unit of operation.

6. The method of claim 4, further comprising:
determining whether data is indicated as being copied through the copy area after recovering from a failure;
writing the data from the copy area to the destination stripe in the indicated current unit of operation in response to determining that the data is indicated as being copied through the copy area; and
continuing processing the units of operation to complete the migration of the source stripes to the destination stripes.

7. The method of claim 1, further comprising:
determining a depth of a source volume including the source stripes and a depth of a destination volume including the destination the destination stripes;
writing the source stripes in descending order from one source stripe at a first physical location of the source volume to the destination stripes in response to determining that the destination volume depth exceeds the source volume depth; and
writing the source stripes in ascending order from one source stripe at a last physical location of the source volume to the destination stripes in response to determining that the destination volume depth does not exceed the source volume depth.

8. The method of claim 1, further comprising:
determining whether an overlap comprising the source stripe and the destination stripe occupying the same physical location is permissible; and
aborting the migration in response to determining that the overlap is impermissible.

9. The method of claim 8, wherein determining whether the overlap is impermissible comprises:
determining a depth of a source volume including the source stripes and a depth of a destination volume including the destination stripes;
determining a source physical location on one storage unit of a first block in a first stripe in the destination volume and a destination physical location on one storage unit of a first block in a first stripe in the source volume; and
determining that the migration is impermissible in response to determining: (1) that the destination volume depth is less than or equal to the source volume depth and the destination physical location is greater than the source physical location or (2) that the destination volume depth is greater than the source volume depth and the destination physical location is less than the source physical location.

10. The method of claim 1, wherein a number of the first plurality of storage units is different than a number of the second plurality of storage units.

11. The method of claim 1, further comprising:
detecting a failure of one of the first plurality of storage units;
rebuilding data from the failed storage units using parity data on the first plurality of storage units that did not fail, wherein the migration is performed to transfer the rebuilt data and the data in the first plurality of storage units that did not fail to the second plurality of storage units including the storage units of the first plurality that survived.

12. The method of claim 1, wherein the storage units comprise magnetic hard disk drives and wherein a Redundant Array of Independent Disk (RAID) algorithm is used to stripe the data to the disks.

13. The method of claim 1, further comprising:
copying the source stripe directly to the destination stripe in response to determining that the source stripe and the destination stripe do not occupy the same physical location on the storage units.

14. A system in communication with a plurality of storage units, comprising:
a source map indicating blocks of data striped across a first plurality of storage units;
a destination map indicating blocks of data striped across a second plurality of storage units; and
circuitry comprising a storage controller, the circuitry being operable to:
migrate data from stripes indicated in the source map to corresponding stripes indicated in the destination map; and
for each of a plurality of source stripes to copy to corresponding destination stripes, separately performing, in response to determining that the source stripe and the destination stripe occupy a same physical location on the storage units, write the data from a source stripe to a copy area and writing the data from the copy area to a corresponding destination stripe.

15. The system of claim 14, wherein the circuitry is further operable to:
determine units of operation, wherein one unit of operation comprises one stripe indicated in the source map to migrate to one stripe indicated in the second map, wherein the data is migrated by processing the units of operation.

16. The system of claim 15, wherein the circuitry is further operable to:
lock data in one source stripe in one unit of operation currently being migrated; and
unlock the locked data after completing the migration of the source data in the unit of operation.

17. The system of claim 14, wherein the circuitry is further operable to:
indicate a number of a current unit of operation being processed; and
indicate data is being copied through the copy area in response to determining that the source stripe and destination stripe involved in the current unit of operation occupy the same physical locations.

18. The system of claim 17, wherein the circuitry is further operable to:
increment the current unit of operation in response to completing copying the source stripe to the destination stripe for one unit of operation; and indicate data is not being copied through the copy area in response to completing copying the source stripe to the destination stripe for one unit of operation.

19. The system of claim 17, wherein the circuitry is further operable to:
   determine whether data is indicated as being copied through the copy area after recovering from a failure;
   write the data from the copy area to the destination stripe in the indicated current unit of operation in response to determining that the data is indicated as being copied through the copy area; and
   continue processing the units of operation to complete the migration of the source stripes to the destination stripes.

20. The system of claim 14, wherein the circuitry is further operable to:
   determine a depth of a source volume including the source stripes and a depth of a destination volume including the destination the destination stripes;
   write the source stripes in descending order from one source stripe at a first physical location of the source volume to the destination stripes in response to determining that the destination volume depth exceeds the source volume depth; and
   write the source stripes in ascending order from one source stripe at a last physical location of the source volume to the destination stripes in response to determining that the destination volume depth does not exceed the source volume depth.

21. The system of claim 14, wherein the circuitry is further operable to:
   determine whether an overlap comprising the source stripe and the destination stripe occupying the same physical location is impermissible; and
   abort the migration in response to determining that the overlap is impermissible.

22. The system of claim 21, wherein determining whether the overlap is impermissible comprises:
   determining a depth of a source volume including the source stripes and a depth of a destination volume including the destination stripes;
   determining a source physical location on one storage unit of a first block in a first stripe in the destination volume and a destination physical location on one storage unit of a first block in a first stripe in the source volume; and
   determining that the migration is impermissible in response to determining: (1) that the destination volume depth is less than or equal to the source volume depth and the destination physical location is greater than the source physical location or (2) that the destination volume depth is greater than the source volume depth and the destination physical location is less than the source physical location.

23. The system of claim 14, wherein a number of the first plurality of storage units is different than a number of the second plurality of storage units.

24. The system of claim 14, wherein the circuitry is further operable to:
   detect a failure of one of the first plurality of storage units;
   rebuild data from the failed storage units using parity data on the first plurality of storage units that did not fail, wherein the migration is performed to transfer the rebuilt data and the data in the first plurality of storage units that did not fail to the second plurality of storage units including the storage units of the first plurality that survived.

25. The system of claim 14, wherein the circuitry is further operable to:
   copy the source stripe directly to the destination stripe in response to determining that the source stripe and the destination stripe do not occupy the same physical location on the storage units.

26. A system, comprising:
   a plurality of storage units;
   a source map indicating blocks of data striped across a first plurality of storage units;
   a destination map indicating blocks of data striped across a second plurality of storage units; and
   circuitry operable to:
      migrate data from stripes indicated in the source map to corresponding stripes indicated in the destination map; and
      for each of a plurality of source stripes to copy to corresponding destination stripes, separately performing, in response to determining that the source stripe and the destination stripe occupy a same physical location on the storage units, write the data from a source stripe to a copy area and writing the data from the copy area to a corresponding destination stripe.

27. The system of claim 26, wherein the circuitry is further operable to:
   indicate a number of a current unit of operation being processed; and
   indicate data is being copied through the copy area in response to determining that the source stripe and destination stripe involved in the current unit of operation occupy the same physical locations.

28. The system of claim 26, wherein the storage units comprise magnetic hard disk drives and wherein a Redundant Array of Independent Disk (RAID) algorithm is used to stripe the data to the disks.

29. The system of claim 26, wherein the circuitry is further operable to:
   copy the source stripe directly to the destination stripe in response to determining that the source stripe and the destination stripe do not occupy the same physical location on the storage units.

30. An article of manufacture comprising at least one of processor executable code in a computer readable medium and logic implemented in a hardware device capable of causing operations, the operations operable to:
   provide a source map indicating blocks of data striped across a first plurality of storage units and a destination map indicating blocks of data striped across a second plurality of storage units, wherein data is migrated from stripes indicated in the source map to corresponding stripes indicated in the destination map; and
   for each of a plurality of source stripes to copy to corresponding destination stripes, separately performing, in response to determining that the source stripe and the destination stripe occupy a same physical location on the storage units, write the data from a source stripe to a copy area and writing the data from the copy area to a corresponding destination stripe.

31. The article of manufacture of claim 30, wherein the operations are further operable to:
   determine units of operation, wherein one unit of operation comprises one stripe indicated in the source map to migrate to one stripe indicated in the second map, wherein the data is migrated by processing the units of operation.

32. The article of manufacture of claim 31, wherein the operations are further operable to:
- lock data in one source stripe in one unit of operation currently being migrated; and
- unlock the locked data after completing the migration of the source data in the unit of operation.

33. The article of manufacture of claim 31, wherein the operations are further operable to:
- indicate a number of a current unit of operation being processed; and
- indicate data is being copied through the copy area in response to determining that the source stripe and destination stripe involved in the current unit of operation occupy the same physical locations.

34. The article of manufacture of claim 33, wherein the operations are further operable to:
- increment the current unit of operation in response to completing copying the source stripe to the destination stripe for one unit of operation; and
- indicate data is not being copied through the copy area in response to completing copying the source stripe to the destination stripe for one unit of operation.

35. The article of manufacture of claim 33, wherein the operations are further operable to:
- determine whether data is indicated as being copied through the copy area after recovering from a failure;
- write the data from the copy area to the destination stripe in the indicated current unit of operation in response to determining that the data is indicated as being copied through the copy area; and
- continue processing the units of operation to complete the migration of the source stripes to the destination stripes.

36. The article of manufacture of claim 30, wherein the operations are further operable to:
- determine a depth of a source volume including the source stripes and a depth of a destination volume including the destination the destination stripes;
- write the source stripes in descending order from one source stripe at a first physical location of the source volume to the destination stripes in response to determining that the destination volume depth exceeds the source volume depth; and
- write the source stripes in ascending order from one source stripe at a last physical location of the source volume to the destination stripes in response to determining that the destination volume depth does not exceed the source volume depth.

37. The article of manufacture of claim 30, wherein the operations are further operable to:
- determine whether an overlap comprising the source stripe and the destination stripe occupying the same physical location is impermissible; and
- abort the migration in response to determining that the overlap is impermissible.

38. The article of manufacture of claim 37, wherein determining whether the overlap is impermissible comprises:
- determining a depth of a source volume including the source stripes and a depth of a destination volume including the destination stripes;
- determining a source physical location on one storage unit of a first block in a first stripe in the destination volume and a destination physical location on one storage unit of a first block in a first stripe in the source volume; and
- determining that the migration is impermissible in response to determining: (1) that the destination volume depth is less than or equal to the source volume depth and the destination physical location is greater than the source physical location or (2) that the destination volume depth is greater than the source volume depth and the destination physical location is less than the source physical location.

39. The article of manufacture of claim 30, wherein a number of the first plurality of storage units is different than a number of the second plurality of storage units.

40. The article of manufacture of claim 30, wherein the operations are further operable to:
- detect a failure of one of the first plurality of storage units;
- rebuild data from the failed storage units using parity data on the first plurality of storage units that did not fail, wherein the migration is performed to transfer the rebuilt data and the data in the first plurality of storage units that did not fail to the second plurality of storage units including the storage units of the first plurality that survived.

41. The article of manufacture of claim 30, wherein the storage units comprise magnetic hard disk drives and wherein a Redundant Array of Independent Disk (RAID) algorithm is used to stripe the data to the disks.

42. The article of manufacture of claim 30, wherein the operations are further operable to:
- copy the source stripe directly to the destination stripe in response to determining that the source stripe and the destination stripe do not occupy the same physical location on the storage units.

* * * * *

UNITED STATES PATENT AND TRADEMARK OFFICE
CERTIFICATE OF CORRECTION

PATENT NO. : 7,421,537 B2
APPLICATION NO. : 10/806500
DATED : September 2, 2008
INVENTOR(S) : Corrado It is certified that error appears in the above-identified patent and that said Letters Patent is hereby corrected as shown below:

In column 6, line 65, in Claim 2, delete "second" and insert -- destination --, therefor.

In column 7, line 33, in Claim 7, after "the destination" delete "the destination".

In column 7, line 47, in Claim 8, delete "permissible;" and insert -- impermissible; --, therefor.

In column 8, line 46, in Claim 15, delete "second" and insert -- destination --, therefor.

In column 9, line 18, in Claim 20, after "the destination" delete "the destination".

In column 10, line 44, in Claim 30, after "readable" insert -- storage --.

In column 10, line 65, in Claim 31, delete "second" and insert -- destination --, therefor.

In column 11, line 38, in Claim 36, after "the destination" delete "the destination".

Signed and Sealed this

Eleventh Day of November, 2008

JON W. DUDAS
*Director of the United States Patent and Trademark Office*